United States Patent [19]

Sander et al.

[11] Patent Number: 4,742,448
[45] Date of Patent: May 3, 1988

[54] INTEGRATED FLOPPY DISK DRIVE CONTROLLER

[75] Inventors: Wendell B. Sander, Los Gatos; Robert Bailey, San Jose, both of Calif.

[73] Assignee: Apple Computer, Inc., Cupertino, Calif.

[21] Appl. No.: 943,839

[22] Filed: Dec. 18, 1986

Related U.S. Application Data

[63] Continuation of Ser. No. 573,067, Jan. 24, 1984, abandoned.

[51] Int. Cl.⁴ .................. G06F 13/12; G06F 3/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,100,601 | 7/1978 | Kaufman et al. | 364/200 |
| 4,148,098 | 4/1979 | McCreight et al. | 364/200 |
| 4,210,959 | 7/1980 | Wozniak | 364/200 |
| 4,357,657 | 11/1982 | Fellinger | 364/200 |
| 4,423,480 | 12/1983 | Bauer et al. | 364/200 |
| 4,433,378 | 2/1984 | Leger | 364/200 |
| 4,494,196 | 1/1985 | Greer | 364/200 |
| 4,549,262 | 10/1985 | Chung et al. | 364/200 |

OTHER PUBLICATIONS

Western Digital; May 1980; FD179X-02 Floppy Disk Formatter/Controller Family; 24 pages.
Zaks; 1979; Microprocessor Interfacing Techniques; pp. 198-207.
Intel, 8271/2 Data Sheets, 1979.

*Primary Examiner*—Gary V. Harkcom
*Assistant Examiner*—C. H. Lynt
*Attorney, Agent, or Firm*—Blakely, Sokoloff, Taylor & Zafman

[57] ABSTRACT

A floppy disk drive controller interface implemented as an integrated circuit on a single semi-conductor chip. The controller connects to a host computer data bus and one or more floppy disk drives. Based upon clocking and control signals received from a digital computer, the controller generates serial encoded data for recording on a floppy disk and receives serial encoded data previously recorded on a floppy disk. The controller comprises a read control circuit including a read data register, write control means including a write data register, a mode register, a status register, state latches, a decoder and special function registers. The controller operates by the setting and clearing of the state latches and reading or writing the mode register, the status register, the special function registers, the read data register and the write data register. The setting of a state latch and accessing of a register is done simultaneously. The controller, under software control, operates in a synchronous or asynchronous read/write mode, and slow or fast read/write mode.

8 Claims, 4 Drawing Sheets

INTEGRATED FLOPPY DISK DRIVE CONTROLLER

This is a continuation of application Ser. No. 573,067 filed Jan. 24, 1984, now abandoned.

BACKGROUND OF THE INVENTION

1. Field of the Invention

The invention relates to the field of controllers for interfacing between a digital computer and a floppy disk drive. The disclosed invention is particularly suited for implementation as an integrated circuit.

2. Prior Art

Floppy disk controllers for interfacing between digital computers and floppy disk drives are well known. Such disk drives include a motor for rotating a floppy disk, a floppy disk being comprised of a flexible material shaped such that it is flat and circular and onto which is bonded a magnetic medium; a write head for recording data on the magnetic medium and a read head for reading data from the magnetic medium; a stepper motor for moving the read and write heads along the surface of the floppy disk; and electronic and logic circuitry for receiving binary signals which turn the disk drive motor on and off, move the read and write heads and cause electrical signals to be sent to the write head for recording data or receive electrical signals generated by the read head as the magnetic medium rotates past it. Disk drive controllers generate the necessary binary signals to turn the disk drive motor on and off, move the read and write heads and send appropriate signals to the electronic and logic circuitry of the disk drive to cause the read and write heads to read from or write to the magnetic medium of the rotating floppy disk. Disk drive controllers generate the appropriate signals to control the operation of disk drives by appropriate control, data and clock signals received from a digital computer.

In U.S. Pat. No. 4,210,959, a floppy disk drive controller is disclosed comprised of a serial/parallel shift register, controller logic and timing means and latches. The serial/parallel shift register is used to transfer data to and from the computer on a data bus. The controller logic and timing means receives signals from the latches to place the controller logic means in one of four possible modes of operation namely, read, sense write protect/write initialize, write record and write load. All reading and writing is done in a synchronous manner based upon a clock signal CLK. The aforesaid invention is directed to a relatively simple, inexpensive controller suitable for consumer and small business applications. The present invention is an integration of the controller disclosed in U.S. Pat. No. 4,210,959 with extensions and improvements including the capability of multiple modes of operation.

BRIEF SUMMARY OF THE INVENTION

A floppy disk drive controller interface is disclosed which is implemented in an integrated circuit. The controller connects to a host computer data bus and one or more floppy disk drives. Based upon clocking and control signals received from a digital computer, the controller generates serial encoded data for recording on a floppy disk and receives serial encoded data previously recorded on a floppy disk. The controller comprises read control means including a read data register, write control means including a write data register, a mode register, a status register, state latches, a decoder and special function registers. The controller operates by the setting and clearing of the state latches and reading or writing the mode register, the status register, the special function registers, the read data register and the write data register. The setting of a state latch and accessing of a register is done simultaneously. The controller, under software control, operates in a synchronous or asynchronous read/write mode, and slow or fast read/write mode.

Control signals received by the controller from the computer set or reset one of eight state latches. Two of the latches select one of two disk drives and turn the drive motor of the selected disk drive on or off. Four of the latches control a stepper motor in the disk drive which cause the read and write heads to move from track to track of the floppy disk. The remaining two latches are coupled to the decoder which decodes clocking and control signals received from the computer and generates signals to the various registers of the controller and to the read control means and write control means for controlling the function to be performed by the disk drive.

DETAILED DESCRIPTION OF THE INVENTION

A floppy disk drive controller, implemented as an integrated circuit, is disclosed for providing an interface between a digital computer and a floppy disk drive. In the following description, numerous specific details are set forth such as specific word or byte lengths, etc., to provide a thorough understanding of the present invention. However, it will be obvious to one skilled in the art that the present invention may be practiced without such specific details. In other instances, well known circuits have been shown in block diagram form in order not to obscure the present invention in unnecessary detail. Unless otherwise stated, for convenience, positive logic will be used to describe the invention. Thus, the terms set, "1", high and true are equivalent as are the terms reset, "0", low and false.

The presently preferred embodiment of the controller provides an interface between microcomputers manufactured by Apple Computer, Inc. of Cupertino, Calif. such as its Apple-II computer and successors thereto, and floppy disk drives such as Disk II manufactured by Apple Computer, Inc., and successors thereto.

Figure 1:
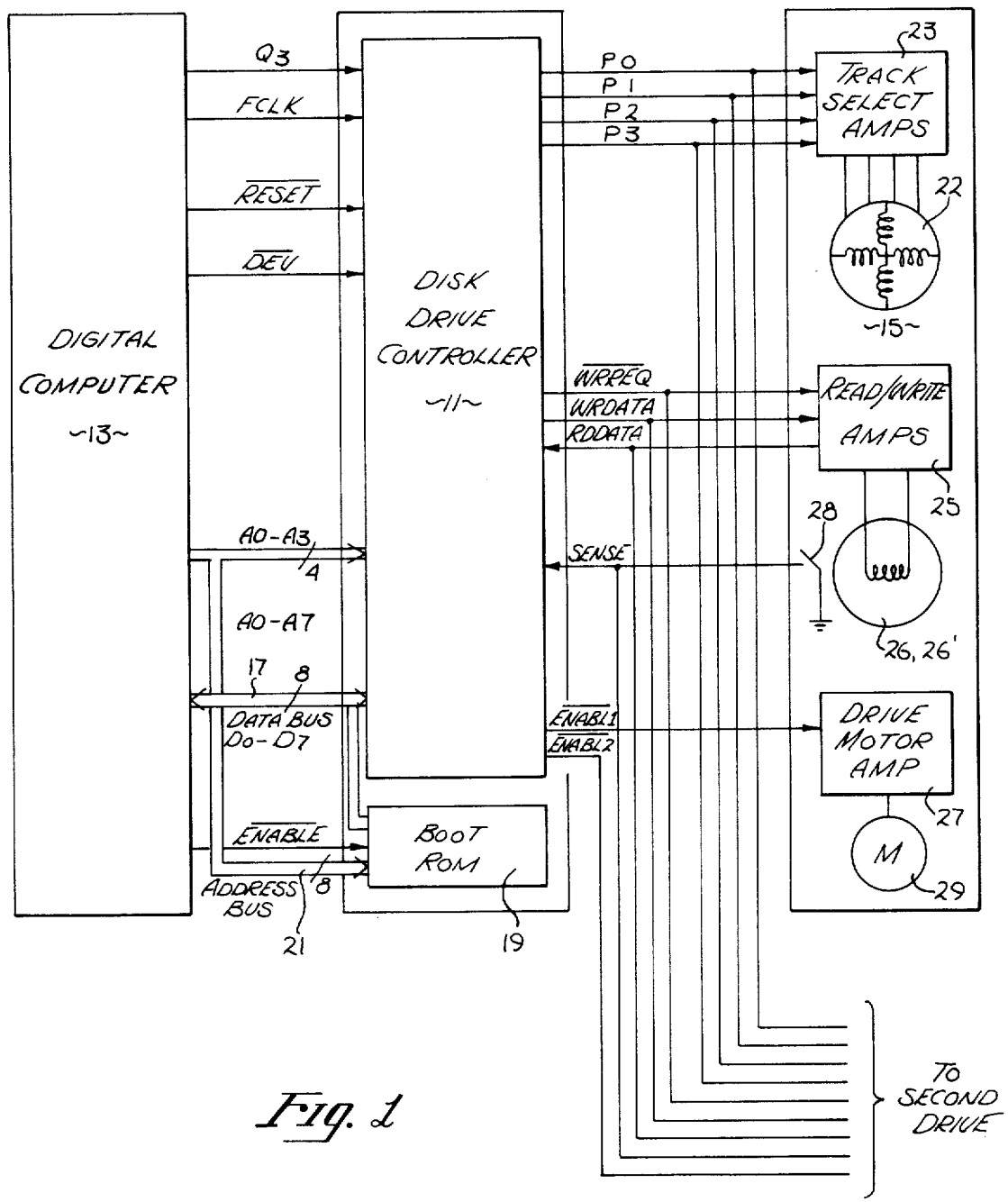
FIG. 1 illustrates the controller of the present invention interfacing between a digital computer and a floppy disk drive.

Referring first to FIG. 1, the controller 11 of the present invention is shown as an interface between a digital computer 13 and a floppy disk drive 15. The digital computer 13 is coupled to the controller 11 through a bidirectional data bus 17 (D0-D7), control lines A0-A3, device select line $\overline{\text{DEV}}$, reset line $\overline{\text{RESET}}$ and clock lines Q3 and FCLK. Although not part of the present invention, also shown in FIG. 1 is boot ROM or PROM 19 which is coupled to the digital computer through data bus 17, address bus 21 (A0-A7) and an enable line $\overline{ENABLE}$. When the computer is first turned on, or whenever it is necessary to reinitialize the computer operating system, a program stored in boot ROM 19 is utilized to instruct the controller 11 to read a program recorded on a floppy disk in disk drive 15 and transfer it over data bus 17 to computer 13. Such boot or boot strap programs are well known in the art and will not further discussed herein.

Data on data bus 17, depending upon signals which have been placed on control lines A0–A3, comprises a byte of data which has been received from the disk drive, which is to be sent to the disk drive or which is to be loaded into or read from registers within the controller 11. The controller 11 is selected by the computer by a "0" on line $\overline{DEV}$ and is placed in an initial state by a "0" on line $\overline{RESET}$. Clock signals generated by the computer on lines Q3 and FCLK are used by the controller as timing signals. Clock signals Q3 and FCLK are generated with periods which depend on the speed of the processor in the computer. In a preferred embodiment, Q3 is a 2 MHz clock and FCLK is a 7 MHz clock. Additionally, Q3 may be left at "0" (if only asynchronous mode is used) and/or FCLK may be 8 MHz.

Data/control lines between the controller 11 and disk drive 15 are as follows. Signals on lines P0 through P3 control a stepper motor 22 which rotates a unit turn in either a forward or backward direction depending upon the signals on lines P0 through P3. In a typical floppy disk drive, a unit turn is a one quarter turn, a one eighth turn, or a one sixteenth turn, however, this value is strictly drive dependent. Each unit turn of the stepper motor causes the read and write heads to move a unit distance in a forward or backward direction. The unit distance the heads move is also drive dependent, but typical unit distances are one-half or one-quarter track. The binary signals on lines P0 through P3 are input to track select amplifiers 23 which convert the binary signals into a voltage which rotates the stepper motor 22.

Signals on WRDATA are binary signals generated by the controller and are input into read/write amplifiers 25 of disk drive 15. Signals on WRDATA cause read/write amplifiers 25 to energize or de-energize the write head coil 26 to cause data to be written on the magnetic medium as it spins under the write head. Signals on $\overline{WRREQ}$ enable to disable write head coil 26 to allow or prevent the writing of data based on WRDATA. Similarly, as the magnetic medium passes under the read head, the read head coil 26' is energized or de-energized and the detected data is converted by the read/write amplifiers 25 into a binary signal which is placed on line RDDATA.

A write protect sense signal is generated by the disk drive 15 and placed on the SENSE line when a switch 28 in the disk drive is closed to indicate that the disk drive has been placed in a write protect state. Such switch may be a mechanical switch operated by a user and/or a switch which detects whether a floppy disk jacket has a write protect notch, such as, for example, a photocell which causes a transistor switch to close when light to it is blocked by the floppy disk jacket.

Lastly, drive select signals are generated by the controller and placed on lines $\overline{ENABL1}$ or $\overline{ENABL2}$. $\overline{ENABL1}$ is input to a first disk drive and $\overline{ENABL2}$ is input to a second disk drive. Each of these $\overline{ENABL1}$ or $\overline{ENABL2}$ inputs is coupled to a drive motor amplifier 27 which converts the binary signal into a voltage to cause a motor 29 in the disk drive to rotate thereby spinning a floppy disk which has been inserted into the disk drive. In the disclosed embodiment, a single bit in the controller is used to generate a signal on $\overline{ENABL1}$ or $\overline{ENABL2}$ and, therefore, only one of two drives can be selected at any given point in time. Of course, with additional hardware, additional drives can be connected to the controller. It should be noted that although only one set of lines is shown as being coupled to controller 11, with respect to lines such as SENSE, which may be set for one drive and reset for the other, appropriate logic circuits are employed to ensure that only signals from the selected drive are input to the controller logic.

Figure 2:
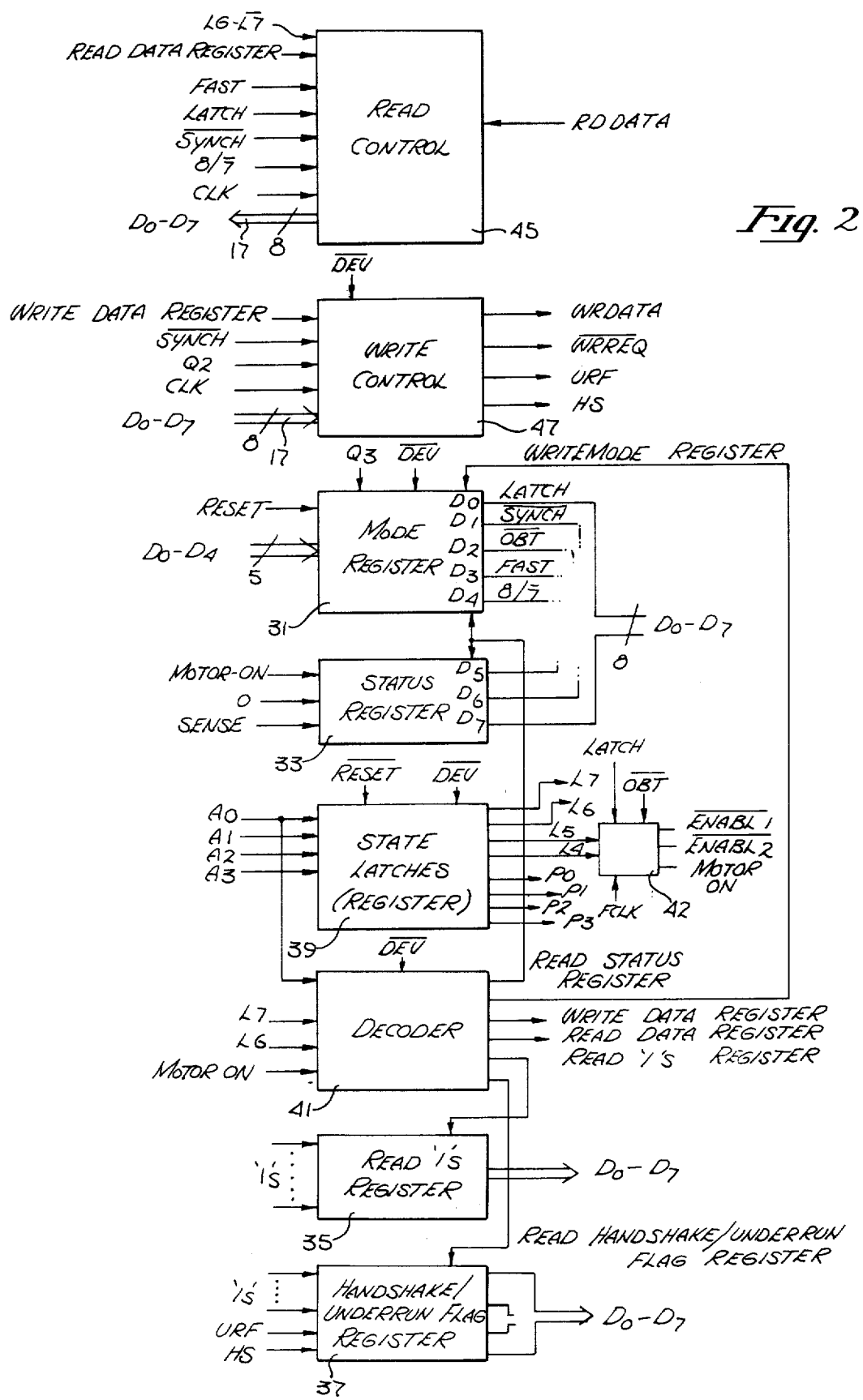
FIG. 2 is a block diagram of the controller of the present invention.

Referring now to FIG. 2, the main components of the controller 11 will now be described. The invented controller comprises mode register 31; status register 33; read 1's register 35; handshake/underrun flag register 37; state latches 39; decoder 41; read control means 45 and write control means 47. Read control means 45 and write control means 47 will be discussed more fully below with respect to FIGS. 3 and 4 respectively.

Once the controller 11 has been selected by the computer 13 by a signal on $\overline{DEV}$ and the controller has been initialized by a signal on $\overline{RESET}$ (which sets the state latches to their default values), the controller is instructed by the computer to perform a particular function by signals on A0–A3 which set or reset one of eight state latches 39 (P0 through P3 and L4 through L7). It should be understood that regardless of the states of the latches P0 through P3 and L4 through L7, unless the controller has been selected by a signal on $\overline{DEV}$, no operations will be performed by the controller. $\overline{DEV}$ enables the controller when it is low. The falling edge of $\overline{DEV}$ latches information on A0 through A3. One of the aforesaid eight latches is set by a "1" on A0 and reset by a "0" on A0. The particular latch to be set or reset based upon A0 is determined by the address set on A1 through A3. Table 1 shows the addresses on A1 through A3 which correspond to latches P0 through P3 and L4 through L7.

TABLE 1

| A3 | A2 | A1 | LATCH |
|----|----|----|-------|
| 0  | 0  | 0  | P0    |
| 0  | 0  | 1  | P1    |
| 0  | 1  | 0  | P2    |
| 0  | 1  | 1  | P3    |
| 1  | 0  | 0  | L4    |
| 1  | 0  | 1  | L5    |
| 1  | 1  | 0  | L6    |
| 1  | 1  | 1  | L7    |

Signals on P0 through P3 cause the stepper motor 22 to operate as follows. Setting P0 causes the stepper motor to be placed in an initial state readying it for a one unit turn in either a forward or backward direction depending upon the next signal received. If the next signal received is P1 (i.e., when latch P1 is set), the stepper motor turns one unit which causes the read and write heads to move a unit distance forward. If P3 is set after P0, then the stepper motor turns one unit in the opposite direction and the read and write heads step one unit distance backwards. At this point, both P0 and P1 are set (or P0 and P3 if the heads are being moved backwards) and P0 is cleared. After P0 is cleared, assuming additional forward head travel is desired, P2 is set which causes the stepper motor to turn an additional unit in the forward direction stepping the read and write heads another unit distance forward. If additional head movement in the forward direction is necessary, P1 is cleared and P3 is set causing an additional unit turn of the stepper motor. In a similar manner, if backwards movement of the read and write heads are necessary, and P0 has been set followed by P3, P0 is cleared and P2 is set followed by the clearing of P3 and the setting of P1, each of which causes the stepper motor to rotate a unit turn in the opposite direction and step the read and write heads a unit distance in a backwards direction. Further cycles of P0, P1, P2, P3 (for forward motion) or P0, P3, P2, P1 (for backwards head travel), may be issued by the computer 13 by addresses on A0 through A3, as appropriate, to cause the read and write heads to move to any desired track.

The setting and clearing of L4 through L7 determine other functions to be performed by the controller 11 as described below.

After the controller has been selected by $\overline{DEV}$ and initialized by $\overline{RESET}$, and WRITE MODE REGISTER is set as described below, D0 through D4 on the data bus 17 are loaded into the mode register 31 to select a particular mode of operation for subsequent reads and writes. The data on D0 through D4 correspond respectively to the signals LATCH, $\overline{SYNCH}$, $\overline{OBT}$, FAST and $8/\overline{7}$ of the mode register. LATCH will be discussed more fully below with respect to the read control means 45 and FIG. 3. $\overline{SYNCH}$, when cleared, places the controller in a synchronous mode for subsequent reads and writes. When $\overline{SYNCH}$ is set, subsequent reads and writes are performed in an asynchronous mode. Both synchronous and asynchronous modes of operation will be discussed more fully below with respect to FIGS. 3 and 4.

$\overline{OBT}$ when cleared enables a one second on board timer. When $\overline{OBT}$ is set, the timer is disabled. The on board timer will be discussed more fully below with respect to $\overline{ENABL1}$ and $\overline{ENABL2}$ which select one of two disk drives which are coupled to the controller.

When FAST is cleared, the controller operates in slow mode. Normally, internal timing of the controller is based upon the clock signal CLK which is equal to the clock signal FCLK generated by the computer. When FAST is cleared, internal timing, i.e. CLK period, is equal to twice the period of FCLK.

$8/\overline{7}$ also relates to timing the FCLK. When an 8 MHz clock is in use, $8/\overline{7}$ is set. If FCLK is running at 7 MHz, $8/\overline{7}$ is cleared. The value of $8/\overline{7}$ is used by the controller to determine how many FCLK periods are required for a given unit of time. For example, if FCLK is 8 MHz, one microsecond will be eight clock periods; if FCLK is 7 MHz, one microsecond will be seven clock periods. This allows computers with 7 MHz clocks and computers with 8 MHz clocks to read and write equivalently, that is, data written by a computer with a 7 MHz clock can be read by a computer with an 8 MHz clock and visa versa.

After the mode register has been loaded to set up particular modes of operation, one of the two drives is selected by latch L5 as follows. When latch L5 is cleared, drive 1 is selected. When latch L5 is set, drive 2 is selected. After a drive has been selected, setting latch L4 will cause line MOTOR-ON to go to "1". When latch L4 is set, if latch L5 is "0", drive 1 is enabled by $\overline{ENABL1}$; if L5 is "1", drive 2 is enabled by $\overline{ENABL2}$.

$\overline{OBT}$ mentioned above can now be described. When $\overline{OBT}$ is set, if L4 is cleared, $\overline{ENABL1}$ or $\overline{ENABL2}$ is disabled by logic circuit 42, which includes the onboard timer, depending upon the setting of L5, thereby shutting down drive motor 29. However, if $\overline{OBT}$ is cleared, then the clearing of L4 will not cause logic circuit 42 to disable $\overline{ENABL1}$ or $\overline{ENABL2}$ until a one second timer has elapsed (if LATCH is reset or until a one-half millisecond timer has elapsed if LATCH is set). Generally, it is preferable that there be a delay before turning off a drive motor because subsequent disk operations frequently occur in a very short time frame after prior disk operations. Thus, without the delay before disabling $\overline{ENABL1}$ or $\overline{ENABL2}$, subsequent disk operations would be subjected to waiting for the motor to achieve proper speed. Of course, the operation system or other program in the computer should include appropriate waits or timing loops, when necessary, to ensure that no disk reads or writes are requested until the drive motor is up to speed. Additional functions performed by the controller are determined by the settings of L6, L7, and MOTOR-ON. L6, L7 and MOTOR-ON select which register is to be read or written as described below. Registers are read during any operation in which A0 is being cleared. Registers are written to when A0 is being set. L6, L7 MOTOR-ON, A0 and $\overline{DEV}$ are input to decoder 41 which decodes the inputs and, as described below, places a "1" on one of the lines READ STATUS REGISTER, WRITE MODE REGISTER, WRITE DATA REGISTER, READ DATA REGISTER, READ 1's REGISTER or READ HANDSHAKE/UNDERRUN FLAG REGISTER. Each of the following operations take place as the falling edge of $\overline{DEV}$ is input to decoder 41.

When L6, L7 and MOTOR-ON are "0", the decoder 41 places a "1" on READ 1's REGISTER which causes the read 1's register 35 to place a byte of binary 1's on the data bus 17, lines D0 through D7. The 1's on the data bus are read into the memory of the computer for use by the operating system or other program.

When L6, L7 are "0" and MOTER-ON is "1", the decoder 41 places a "1" on READ DATA REGISTER. The function performed when READ DATA REGISTER is set will be discussed below with reference to the read control means 45 and FIG. 3.

When L6 is "1", L7 is "0" and MOTOR-ON is "0" or "1" (i.e. don't care), the decoder 41 places a "1" on READ STATUS REGISTER which causes the contents of the mode register 31 and status register 33 to be placed on data bus 17, such that the bus takes on the following values; LATCH is placed on D0, $\overline{SYNCH}$ is placed on D1, $\overline{OBT}$ is placed on D2, FAST is placed on D3, $8/\overline{7}$ is placed on D4, MOTOR-ON is placed on D5, a 0 is placed on D6 and SENSE, from the disk drive, is placed on D7. The operating system or other program in the computer 13 is then able to determine the status of controller 11.

When L6 is "0", L7 is "1" and MOTOR-ON is "0" or "1", the decoder 41 places a "1" on READ HANDSHAKE/UNDERRUN FLAG REGISTER which causes the handshake/underrun flag register 37 to place "1"'s on D0 through D5, an underrun flag URF on D6 and a handshake flag HS on D7. The underrun flag URF and the handshake flag HS will be discussed with respect to the write control means 47 and FIG. 4.

When L6 is "1", L7 is "1" and MOTOR-ON is "0", the decoder 41 places a "1" on WRITE MODE REGISTER and the data on D0 through D4 of the data bus 17 is written into the mode register 31 with D0 corresponding to LATCH, D1 corresponding to $\overline{SYNCH}$, D2 corresponding to $\overline{OBT}$, D3 corresponding to FAST and D4 corresponding to $8/\overline{7}$. This occurs during WRITE MODE REGISTER at the rising edge of the logical function Q3 or $\overline{\text{DEV}}$.

When L6, L7 and MOTOR-ON are "1", the decoder 41 places a "1" on WRITE DATA REGISTER. The function performed when WRITE DATA REGISTER is set will be discussed below with reference to write control means 47 and FIG. 4.

Figure 3:
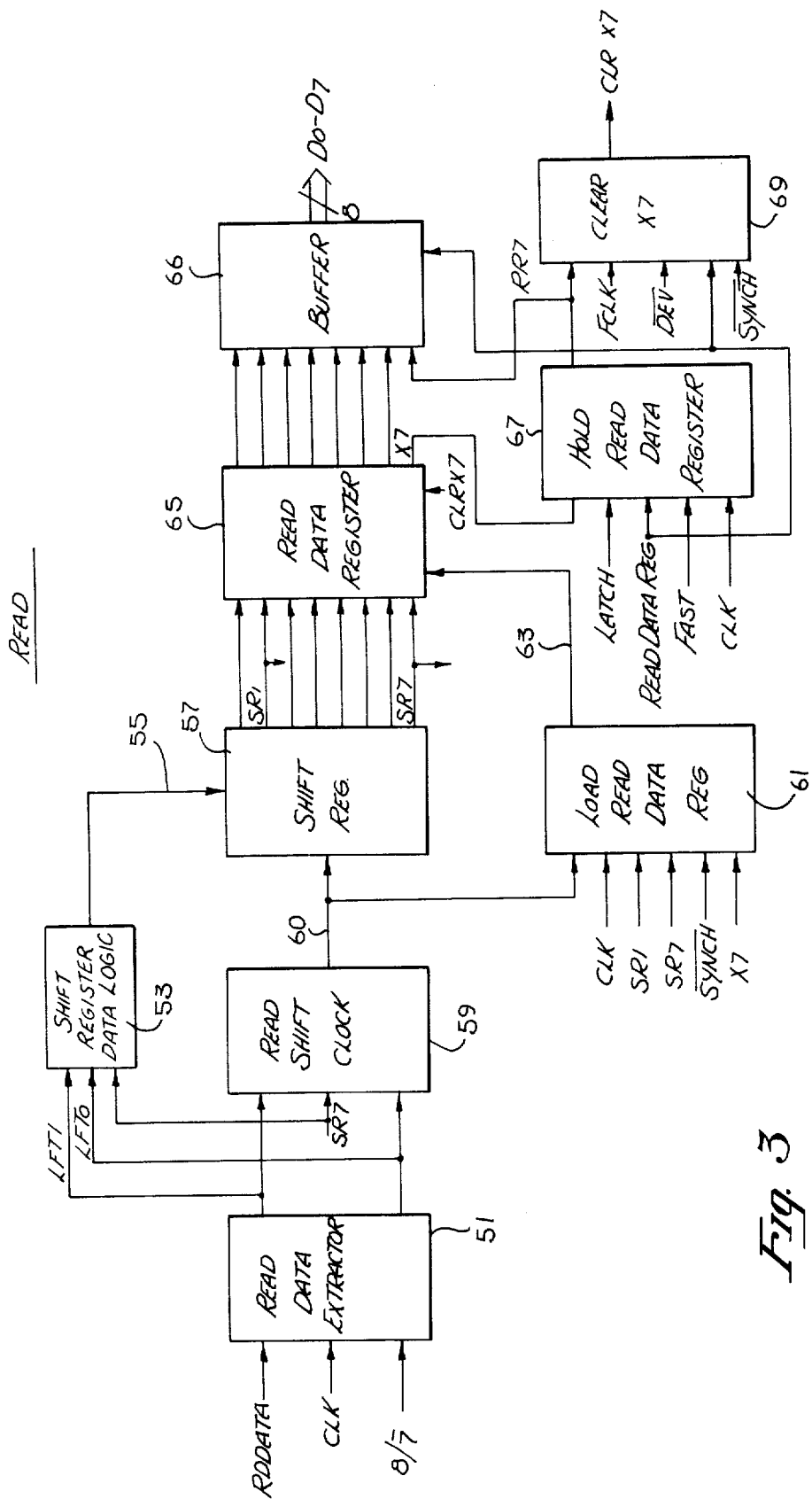
FIG. 3 is a detailed block diagram of the read control means of the present invention.

The read control means 45 will now be discussed with reference to FIG. 3. As noted above, with L6 and L7 equal to "0" and MOTOR-ON equal to "1", the decoder 41 places a "1" on READ DATA REGISTER. Of course, prior to reading, the read head is moved to the desired track of the floppy disk by rotating the stepper motor 22 according to control signals on P0 through P3 as described above. As the floppy disk rotates under the read head, data recorded the track causes the coil in the read head to be energized and de-energized causing fluctuations on RDDATA corresponding to set bits and cleared bits on the magnetic medium. At this time, neither the controller nor the computer can determine which portion of a track is under the read head. Therefore, a method for determining where data reading should be started is necessary. A method for providing proper synchronization for such purpose is described in U.S. Pat. No. 4,210,959.

Once synchronization has been obtained, reading proceeds as follows. The read data extractor 51 detects negative transitions of RDDATA synchronized to the CLK clock signal. Each time a negative transition of RDDATA occurs, it resets an interval counter. When $8/\overline{7}$ is set, the interval is 16 CLKs. When $8/\overline{7}$ is reset, the interval is 14 CLKs. The information on RDDATA is spaced at these intervals or "around" these intervals. A "1" is a negative transition at the expected time, i.e. interval. A "0" is no transition at the expected time. The expected time is widened by approximately one-half an interval before and after the expected time since the data is not precisely spaced when read due to variations in drive speed and other external factors.

A negative transition of RDDATA is detected as a "1" and the read data extractor 51 causes the signal LFT1 to pulse to a "1" for one CLK cycle. The next expected data is nominally at 16 CLKs when $8/\overline{7}$ is set. This may range between 16−8=8 CLKs and 16+7=23 CLKS. Thus, if another negative transition of RDDATA occurs between 8 and 23 CLKs, another "1" is detected and LFT1 pulses to a "1" for one CLK cycle. If no negative transition occurs on RDDATA between 8 and 23 CLKs a "0" is detected and LFT0 pulses to "1" for one CLK cycle.

If a LFT1 has occurred within the expected time, the interval counter is reset, otherwise the next expected data is nominally at 32 CLKs. This may range between 32−8=24 CLKS and 32+7=39 CLKs. If a negative transition of RDDATA occurs between 24 and 39 CLKs, a "1" is detected and LFT1 will pulse to "1" for one CLK cycle. If no negative transition of RDDATA occurs a "0" is detected and LFT0 will pulse to "1". Similarly, subsequent intervals are widened from the nominal number of CLKs by minus 8 CLKs and plus 7 CLKs with LFT1 being pulsed if a negative transition of RDDATA occurs within the widened interval and LFT0 being pulsed if there is no negative transition of RDDATA. When $8/\overline{7}$ is reset, LFT0 and LFT1 are pulsed as described above, except intervals are nominally 14 CLKs and are widened minus 7 CLKs and plus 6 CLKs.

LFT0 and LFT1 are input to shift register data logic circuitry 53 which sets line 55 if LFT1 is "1" or clears line 55 if LFT0 is "1" unless SR7 is "1" (as described below), the data on line 55 being the data input to shift register 57.

The data on line 55, when shift register 57 is signaled by shift clock 59 by a signal on line 60, is input to the shift register one bit at a time. Shift clock 59 sets line 60 at the end of each LFT1 pulse or LFT0 pulse except when SR7 is set. SR7 is set after a full byte of data has been shifted into the shift register. This occurs because the initial bit received by the shift register 57 from the data stored on the disk is always a "1" according to the group code coding scheme utilized for storing data on the diskette. Wherein the leading bit of a byte is always a "1".

Once SR7 is set, load read data register logic 61 generates a signal on line 63 which causes the data in shift register 57 to be parallel loaded into the read data register 65. The shift register 57 is cleared one half a read shift clock after SR7 is set so that it is ready to accept the next byte of data.

The signal on line 63 is set by load read data register logic 61 as follows.

In synchronous mode, i.e. when $\overline{\text{SYNCH}}$ is "0", when X7 is reset, the read data register 65 is loaded with the data in the shift register 57 each time the shift register 57 shifts by the setting of line 63 by load read data register logic 61. However, when X7 is set, i.e., when the first bit of the byte being read arrives at the far end of the shift register and is parallel loaded into the read data register 65, the load read data logic 61 will hold line 63 low for four CLKs after SR1 (corresponding to bit 1 of shift register 57) becomes "1" due to the first bit of the next byte being shifted through shift register 57. This delay is to ensure that the byte in the read data register 65 is there, and therefore available to be routed to buffer 66 and on data bus 17 D0 through D7, long enough to be seen by the computer 13, but not long enough to be seen as a valid byte twice. The rising edge of D7 is delayed by hold read data register logic 67 so that if D7 is read by the computer 13 as "1", it is guaranteed that the data on D0 through D6 will have been correctly written into a register in the conputer 13. This delay is created by the hold read data register logic 67 as follows. When LATCH is cleared, which it should be during synchronous mode operation, and X7, corresponding to bit 7 of read data register 65, is set, output RR7 from hold read data logic 67, which corresponds to input bit 7 of buffer 66, is not set until 1 CLK period, when FAST is "1" (fast mode), and a ½ CLK period when FAST is "0" (slow mode) after X7 is set.

In asynchronous mode, i.e. when $\overline{\text{SYNCH}}$ is set, read data register 65 is parallel loaded from shift register 57. This ocurs by the load read data register logic 61 setting line 63 when SR7 is set. To ensure that the data in read data register 65 is properly loaded into a register in computer 13, in asynchronous mode, LATCH should always be set. When LATCH is set, the data on X7 is placed on RR7 by hold read data register logic 67 at the rising edge of READ DATA REGISTER. This ensures that D7 will meet the set up and hold requirements of the computer 13. If D7 is read by the conputer 13 as "1", D0 through D7 are correctly written into a register of the computer 13. X7 will be reset by clear X7 logic 69 fourteen FCLK's after READ DATA REGISTER is set and D7 is "1" (i.e., the byte has been read by the computer) so that X7 will be clear and the conputer 13 will not re-read the byte as valid during subsequent polling, i.e., setting of READ DATA REGISTER.

Figure 4:
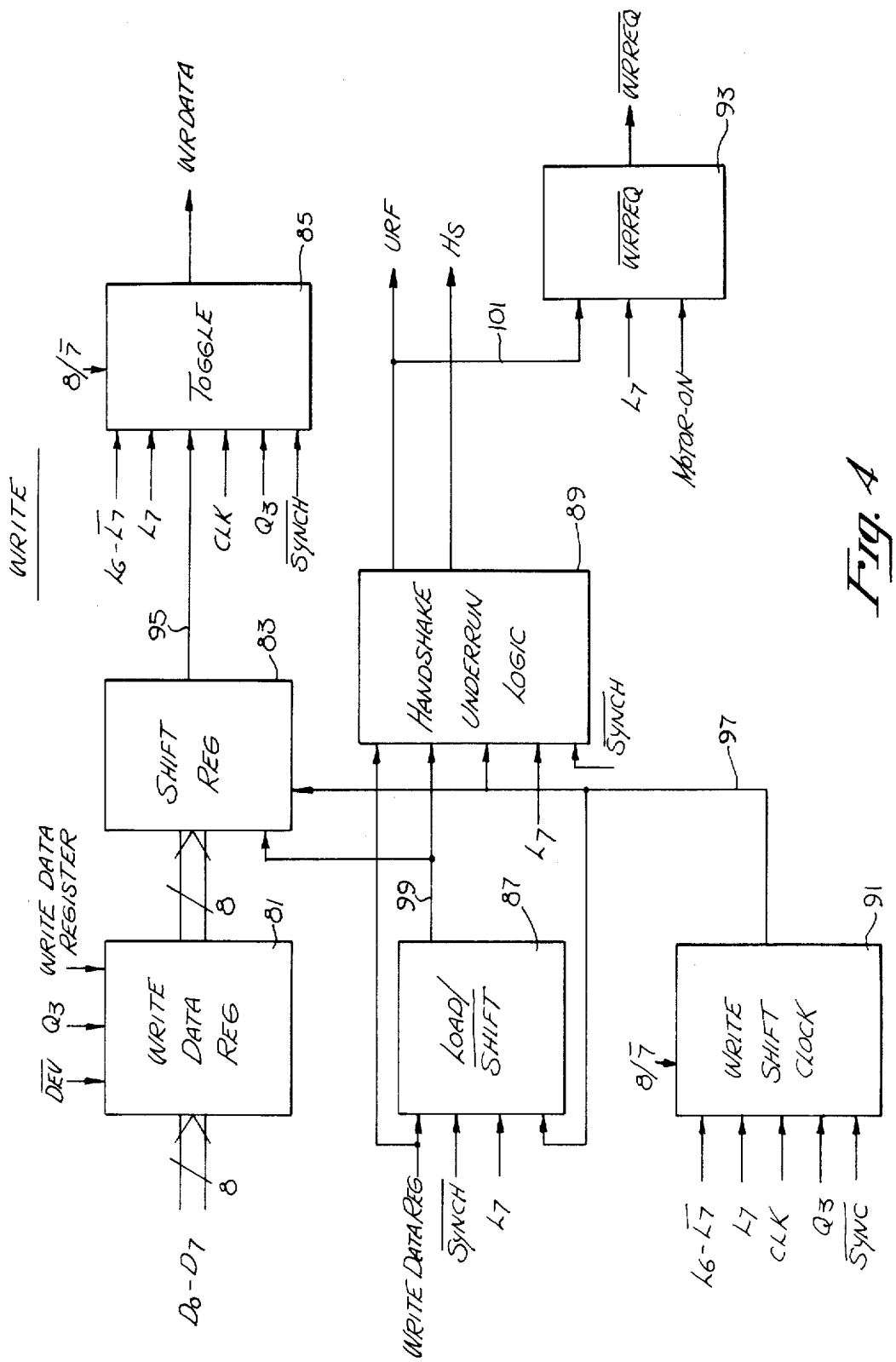
FIG. 4 is a detailed block diagram of the write control means of the present invention.

Write control means 47 will now be described with reference to FIG. 4. Write control means comprises write data register 81 for receiving a byte of data to be written on the disk, shift register 83 for converting the parallel data in write data register 81 to serial form, and toggle 85 for generating the bitstream which is to be written onto the disk. Write control means 47 further comprises load/shift logic 87, handshake/underrun logic 89, write shift clock 91 and $\overline{\text{WRREQ}}$ logic 93, all of which control the timing of the write control means.

To initiate a write, L6 is set, L7 is cleared to set up a pre-write state. The pre-write state initializes the write shift clock 91 and load/shift logic circuit 87 setting line 99, sets WRDATA and $\overline{\text{WRREQ}}$, resets underrun flag URF in handshake/underrun flag register 37 and initializes a toggle clock in toggle 85. Prior to actual writing, L4 and L5 should be placed in appropriate states to select the desired drive and set MOTOR-ON. When L6, L7 and MOTOR-ON are "1", the decoder places a "1" on WRITE DATA REGISTER which loads data from data bus 17, D0 through D7, to the write data register 81 at the rising edge of the logical function Q3 or $\overline{\text{DEV}}$. This register is in turn parallel loaded into shift register 83 as follows. As noted above, when load/shift control logic 87 is initialized, line 99 is set. When line 99 is set, a pulse from the write shift clock 91 on line 97 causes data in write data register 81 to be latched into shift register 83. In asynchronous mode ($\overline{\text{SYNCH}}$ is set), the load will be completed approximately eight CLK's after WRITE DATA REGISTER has been set. In synchronous mode, the load will be completed between four and five Q3 periods after WRITE DATA REGISTER has been set.

In synchronous mode, ($\overline{\text{SYNCH}}$ is reset) writing continues as follows. Once the data has been loaded into shift register 83, the most significant bit in the shift register will be shifted onto line 95 which will cause (after two Q3 periods) the WRDATA to toggle from "1" to "0" since WRDATA is initialized at "1" and, according to the group code coding scheme used, the first bit of a byte must be a "1". Shift register 83 will shift every eight Q3 periods after it has been loaded, followed two Q3 periods later with a toggle, if the date on line 95 is a "1", and will continue such shift and toggle until the byte has been written. Thus, a byte of data is shifted out and written in 64 Q3 periods and a new byte of data can then be parallel loaded into shift register 83. With this timing, a "1" must be placed on WRITE DATA REGISTER every 64 Q3 periods, otherwise 0's will be shifted out of shift register 83. During synchronous mode URF is always reset so that URF does not prevent writing data on disk by causing $\overline{\text{WRREQ}}$ to be set.

When the controller is in asynchronous mode ($\overline{\text{SYNCH}}$ is set), the timing constraints of synchronous writes are relaxed. When in asynchronous mode, write control means 47 operates as follows. After shift register 83 has been parallel loaded with the data from write data register 81, the most significant bit in shift register 83 will be shifted onto line 95 and after eight more CLK periods, toggle 85 will cause WRDATA to toggle from "1" to "0" since, as noted above, the most significant bit must be a "1". Subsequent shifts and toggles are separated by eight CLKs. After all eight bits have been shifted out of shift register 83, load/shift logic 87 places a "1" on line 99 which parallel loads shift register 83, with data from write data register 81. When 8/$\overline{7}$ is set, shifts and toggles are separated by 8 CLKs. When 8/$\overline{7}$ is reset, toggles occur 6 CLKs after shifts, and shifts occur 8 CLKs after toggles.

Due to the relaxed timing which occurs during asynchronous writes as compared to synchronous writes, the following additional operations are needed to ensure that data is being properly written. Handshake flag HS is set by handshake/underrun logic 89 upon the completion of a parallel loading of shift register 83, as determined by signals on lines 97 and 99 and reset by the handshake/underrun logic 89 when WRITE DATA REGISTER is enabled. Since computer 13 can issue a command to clear L6 which will cause the decoder to enable READ HANDSHAKE/UNDERRUN FLAG REGISTER, the status of the handshake flag HS can be determined by the computer. That is the computer can poll the handshake/underrun flag register 37 until the HS flag is "1" indicating that the write data register 81 has been parallel loaded into the shift register 83 and the write data register is available for another byte of data. Once the computer detects that the write data register 81 is available, it may issue a command to set L6 which will enable WRITE DATA REGISTER which will cause the byte on data bus 17 to be written into write data register 81.

To ensure that a new byte of data has in fact been loaded into the write data register 81 prior to loading the shift register 83, the underrun flag URF in handshake/underrun flag register 37 is employed as follows. As noted above, during the pre-write state when writing is initiated, underrun flag URF is reset, i.e. when L7 is "0". The underrun flag URF is set by handshake/underrun logic 89 when the parallel load of the shift register 83 ends, if the handshake flag is set, indicating a new byte has not been written into the write data register 81. Since the current state of underrun flag URF is input to $\overline{\text{WRREQ}}$ logic 93 through line 101, if URF is set then no new data has been loaded into write data register 81 before loading the shift register 83, and $\overline{\text{WRREQ}}$ logic 93 will enable $\overline{\text{WRREQ}}$ before the next transition of WRDATA occurs. When $\overline{\text{WRREQ}}$ is "1", the write head is disabled preventing the same byte of data from being rewritten. URF can only be reset by exiting from writing, i.e., when L7 is "0".

For an example showing how latches L4 through L7 are set by the computer during asynchronous writes, see Table 2. For an example showing how latches L4 through L7 are set by the computer during synchronous writes, see Table 3.

TABLE 2

| (Asynchronous Writes) | | | | | |
|---|---|---|---|---|---|
| L4 | L5 | L6 | L7 | MOTOR-ON | Action |
| 0 | 0 | 0 | 0 | 0 | initial state |
| 0 | 0 | 1 | 0 | 0 | set L6 |
| 0 | 0 | 1 | 1 | 0 | set L7; write data on bus into the mode register |
| 0 | 0 | 1 | 0 | 0 | clear L7 |
| 0 | 0 | 0 | 0 | 0 | clear L6 |
| 1 | 0 | 0 | 0 | 1 | set L4; select drive 1, set MOTOR-ON |
| 1 | 0 | 1 | 0 | 1 | set L6; pre-write state; initialize write shift clock 91; initialize load/ shift control; set WRDATA; set $\overline{\text{WRREQ}}$; reset URF |
| 1 | 0 | 1 | 1 | 1 | set L7; enable WRITE DATA REGISTER |
| 1 | 0 | 0 | 1 | 1 | clear L6; read HS and URF flags |

TABLE 2-continued (Asynchronous Writes)

| L4 | L5 | L6 | L7 | MOTOR-ON | Action |
|----|----|----|----|----------|--------|
| 1 | 0 | 0 | 1 | 1 | continue polling HS flag until it has been set |
| 1 | 0 | 1 | 1 | 1 | set L6; enable WRITE DATA REGISTER |
| 1 | 0 | 0 | 1 | 1 | clear L6; read HS and URF flags |
| 1 | 0 | 0 | 1 | 1 | continue polling HS flag until it has been set |
| 1 | 0 | 1 | 1 | 1 | set L6; enable WRITE DATA REGISTER |
| 1 | 0 | 1 | 0 | 1 | clear L7; exit write mode |
| 1 | 0 | 0 | 0 | 1 | clear L6 |
| 0 | 0 | 0 | 0 | 1 | clear L4; |
| 0 | 0 | 0 | 0 | 0 | MOTOR-ON clears after timer counts down |

TABLE 3

(Synchronous Writes)

| L4 | L5 | L6 | L7 | MOTOR-ON | Action |
|----|----|----|----|----------|--------|
| 0 | 0 | 0 | 0 | 0 | initial state |
| 0 | 0 | 1 | 0 | 0 | set L6 |
| 0 | 0 | 1 | 1 | 0 | set L7; write data on bus into mode register |
| 0 | 0 | 1 | 0 | 0 | clear L7 |
| 0 | 0 | 0 | 0 | 0 | clear L6 |
| 1 | 0 | 0 | 0 | 1 | set L4; select drive 1, set MOTOR-ON |
| 1 | 0 | 1 | 0 | 1 | set L6; pre-write state; initialize write shift clock; initialize load/shift control; set WRDATA; set $\overline{\text{WRREQ}}$ |
| 1 | 0 | 1 | 1 | 1 | set L7; place a byte of data on data bus 17 every 64 Q3 clocks |
| 1 | 0 | 1 | 0 | 1 | clear L7; exit write mode when done |
| 1 | 0 | 0 | 0 | 1 | clear L6 |
| 0 | 0 | 0 | 0 | 1 | clear L4 |
| 0 | 0 | 0 | 0 | 0 | MOTOR-ON clears after timer counts down |

The diclosed controller may be packaged in a standard 28 pin, 600 mil plastic DIP using well known prior art methods. All of the pinouts are shown in FIG. 1, except for voltage source Vcc and ground.

Thus, a disk controller for interfacing between a digital computer and a floppy disk drive which may be implemented as an integrated circuit has been described. The controller is capable of performing multiple modes of operation, including fast and slow clocking and synchronous and asynchronous reading and writing.

We claim:

1. An integrated circuit floppy disk drive controller formed in a single semiconductor device for interfacing between a digital computer having an address bus and a data bus, and at least one floppy disk drive, said disk drive controller and said computer being coupled by said data bus, said computer generating a clock signal which is input to said controller, said controller comprising:

state storage means for coupling to said computer by said address bus for storing state commands sent by said computer;

decoder means coupled to said state storage means for decoding state commands stored in said state storage means and generating control signals for controlling the operation of a status register means, a read control means and a write control means based upon said decoded commands;

mode storage means coupled to said decoder means and for coupling to said computer, said mode storage means for storing data sent by said computer indicating modes of operation selected by said computer, said modes of operation including at least one of synchronous/asynchronous reading and writing and fast/slow clock;

said status register means coupled to said decoder means, and for coupling to said floppy disk drive and said computer for storing information regarding the status of said at least one disk drive and the controller for interrogation by said computer, said status being determined by the contents of said mode storage means and said status register means;

said read control means coupled to said mode storage means, and for coupling to said computer and said at least one disk drive for receiving data from said disk drive and sending said data to said computer in a mode of operation as determined by said mode storage means; and said write control means coupled to said mode storage means, for coupling to said at least one disk drive for receiving data from said computer and sending said data to said disk drive in a mode of operation as determined by said mode storage means.

2. The controller defined by claim 1 wherein the state commands stored in said state storage means control positioning of a stepper motor in said at least one disk drive, enable and disable a drive motor in said at least one disk drive, select one of said at least one disk drives to write to or read from, and cause said decoder means to generate said control signals as determined by said state commands.

3. The controller defined by claim 2 further comprising a delay timer wherein said modes of operation are asynchronous reading and writing, synchronous reading and writing, timing based on said clock signal running at a first speed, timing based on said clock signal running at a second speed, enabling said delay timer for turning off a drive motor in said at least one disk drive, and disabling said delay timer for turning off said disk drive motor.

4. The controller defined by claim 1 wherein the information stored in said status register means is used to inform said computer when said at least one disk drive is in a write protect state and when a drive motor in said at least one disk drive is activated.

5. The controller defined by claim 1 wherein said read control means comprises:

a read data extractor means for converting serial signals received from said disk drive into a plurality of serial pulses representing binary '1's and binary '0's;

a shift register means coupled to said read data extractor means for converting said plurality of serial pulses into parallel data;

a register means coupled to said shift register means for storing parallel data from said shift register means until said parallel data can be placed on said data bus for transfer to said computer; and a read data control means coupled to said read data extractor means, said shift register means and said register means, said timing signal from said computer being input to said read control means, said read data controls means for controlling the loading of data into said shift register means, said register means and onto said data bus, and using said timing signal to ensure that data sent to said computer is not lost and is not duplicated.

6. The controller defined by claim 5 wherein said read data control means comprises:
- a read shift clock coupled to said read extractor means and said shift register means for generating a signal to cause said shift register means to shift so as to be loaded with data based on said plurality of serial pulses;
- a load read data register logic circuit, coupled to said shift clock, said shift register means and said register means, which sends a signal to said register means when prior data in said register means had been received by said computer as determined by a bit in said register means;
- a hold read data register logic circuit coupled to said register means and a buffer means, said buffer means also being coupled to said register means, said hold read data register logic circuit sending a signal to said buffer means after a predetermined period of time which is long enough to ensure that data in said buffer means has been properly transferred to said computer, said predetermined period of time being based upon the timing of said computer as determined by said clock signal from said computer.

7. The controller defined by claim 1 wherein said write control means comprises:
- register means for storing parallel data from said computer to be sent to said disk drive;
- shift register means coupled to said register means for converting said parallel data into a serial bit stream;
- toggle means coupled to said shift register means for generating pulses representing binary '1's and binary '0's which are sent to said disk drive; and
- write data control means for controlling the loading of data from said computer into said register means, said shift register means, and said toggle means, to ensure that data sent to said disk drive is not lost and is not duplicated.

8. The controller defined by claim 7 wherein said write data control means comprises:
- a write shift clock coupled to said shift register means;
- a load and shift register logic circuit, coupled to said shift register means and said write shift clock, which sends a signal to said shift register means causing the shift register means to load data from said register means and shift data which has been previously loaded; and
- a handshake/underrun logic circuit coupled to said load and shift register logic circuit, and said write shift clock for generating signals to inform said computer when said register means is ready to receive additional data from said computer.

* * * * *